United States Patent Office 3,406,184
Patented Oct. 15, 1968

3,406,184
ADDITION COMPOUNDS OF NORBORNADIENES AND QUADRICYCLENES WITH BIS(TRIFLUORO-METHYL)THIOKETENE AND THEIR S-OXIDES AND S-DIOXIDES
Maynard S. Raasch, Wilmington, Del., assignor to E. I. du Pont de Nemours and Company, Wilmington, Del., a corporation of Delaware
No Drawing. Filed May 4, 1966, Ser. No. 547,437
12 Claims. (Cl. 260—327)

ABSTRACT OF THE DISCLOSURE

6 - hexafluoroisopropylidene-7-thiatetracyclo[3.2.1.1$^{3,8}$.0$^{2,4}$]nonanes and 4-hexafluoroisopropylidene-3-thiatricyclo[4.2.1.0$^{2,5}$]non-7-enes formed by reacting bis(trifluoromethyl)thioketene with norbornadienes and quadricyclenes, respectively, and their S-oxides and S-dioxides are claimed. The S-oxides and S-dioxides are formed by oxidation of the sulfides. The compounds are useful as plasticizers for polythiocarbonyl fluoride.

This invention relates to fluorine-containing polycyclic sulfur compounds, their S-oxides, their S-dioxides and to the proceses for the preparation of these products.

The product embodiment of this invention is directed to 6 - hexafluoroisopropylidene-7-thiatetracyclo[3.2.1.1$^{3,8}$.0$^{2,4}$]nonanes, their S-oxides and S-dioxides (I), and to 4 - hexafluoroisopropylidene-3-thiatricyclo[4.2.1.0$^{2,5}$]non-7-enes, their S-oxides and S-dioxides (II). These products are of the formulae

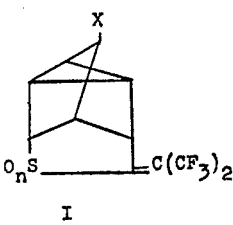   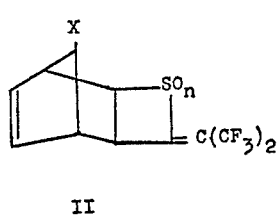

I   II wherein X is selected from the group consisting of hydrogen; a monovalent group R selected from alkyl, cycloalkyl, alkylcycloalkyl, aralkyl, aryl, alkaryl, fluoroalkyl, or fluoroaryl, chloroaryl; halogen; tertiary alkoxy; aryloxy; hydroxy; acyloxy; and RSO$_2$NH—; and $n$ is an integer from 0 to 2. The monovalent group R contains up to 18 carbon atoms; aryl and aralkyl substituents contain carbocyclic aromatic rings selected from the group consisting of phenyl, biphenyl, naphthyl and the alkyl moiety of the aralkyl and alkaryl radicals contain up to 12 carbons.

The sulfide products of this invention, wherein $n=0$, are produced by the addition of bis(trifluoromethyl)-thioketene to 2,5-norbornadienes (III) and to tetracyclo-[2.2.1.0$^{2,6}$.0$^{3,5}$]heptanes (quadricyclenes) (IV). These polycyclic reactants are of the formulae

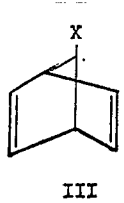   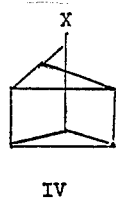

III   IV wherein X is as defined above. The reaction with 2,5-norbornadienes produces 6-hexafluoroisopropylidene-7-thiatetracyclo[3.2.1.3,802,4]nonanes. The reaction with quadricyclenes produces 4 - hexafluoroisopropylidene-3-thiatricyclo[4.2.1.0$^{2,5}$]non-7-enes.

The S-oxides and S-dioxides of this invention are obtained by oxidation of the sulfides of this invention as described below.

Stereoisomeric mixtures of products can be produced by the processes of this invention. Stereoisomerism can occur in 9-substituted products produced from reactants wherein the 7-substituted X is other than hydrogen. The 9-position in the products and 7-position in the reactants is the substituted methano group

Stereoisomerism can occur in this situation since the carbon in the 9-position of the products is an asymmetrical center. The thiatricyclo[4.2.1.0$^{2,5}$]non-7-enes can also exist as endo- and exo-isomers.

Bis(trifluoromethyl)thioketene used as a reactant in this invention is a new compound which has been described and claimed in my copending application, Ser. No. 249,606, filed Jan. 7, 1963, now U.S. Patent No. 3,275,609. The preparation of this compound is described in Example A.

The sulfides of this invention are produced by contacting the cyclic reactant with bis(trifluoromethyl)thioketene at a temperature of 25–150° C. Temperatures of the order of 100° C. are preferred. Bis(trifluoromethyl)ketene boils at 52° C., therefore reactions conducted above that temperature are preferably carried out in a closed vessel under autogenous pressures. This process can be conducted by either batch or continuous processes.

The proportions and mode of addition in which the reactants can be brought together to carry out the process of this invention are not critical and can be varied widely. High yields of the sulfides of this invention, based on the polycyclic reactant, are obtained when the molar ratio of the bis(trifluoromethyl)thioketene to the polycyclic compound is about 1:1 to 6:1, and this range of ratios represents the preferred proportions. However, ratios in the range from 10:1 to 1:5 are operable to produce some of the desired product.

The reaction can be carried out in the presence of or absence of a liquid solvent medium which is inert to the reactants and products. Such inert solvents include hydrocarbons or halogenated hydrocarbons such as hexane, cyclohexane, benzene, toluene, carbon tetrachloride, dichlorotetrafluoroethane, chlorobenzene and the like. The sulfide products can be isolated and purified by conventional processes of distillation and/or crystallization.

The process embodiment of this invention for producing S-oxides and S-dioxides of I and II, that is wherein $n$ is 1 or 2, comprises contacting 6-hexafluoroisopropylidene-7-thiatetracyclo[$3.2.1.1^{3,8}.0^{2,4}$]nonanes or 4-hexafluoroisopropylidene - 3 - thiatricyclo[$4.2.1.0^{2,5}$]non - 7-enes with an oxidizing agent. Oxidizing agents which can be used include hydrogen peroxide, peracetic acid, perbenzoic acid, chromium trioxide, potassium permanganate and the like. S-oxides, which are also known as sulfoxides, are produced when the ratio of the equivalent of oxidizing agent to moles of the sulfide is about 2. S-dioxides, which are also known as sulfones, are produced when the ratio of equivalents of oxidizing agent to moles of the sulfide is about 4 or greater. S-dioxide can also be produced by oxidizing S-oxides with at least 2 equivalents of oxidizing agent per mole of S-oxide. An equivalent weight of oxidizing agent is the gram-molecular weight divided by the total change in valence of all atoms in the molecule which changes valence.

The oxidation process is generally conducted at a temperature of 0–100° C. In some cases lower and higher temperatures can be used. Solvents such as acetone and acetic acid can be used. Aqueous solutions of the oxidizing agent can be used. Oxidizing agent such as peracetic acid, prepared from 30% hydrogen peroxide and glacial acetic acid, is a preferred oxidant.

The S-oxides and S-dioxides are thermally stable products which are less volatile than the corresponding sulfides. S-oxides and S-dioxides can be isolated by distillation under reduced pressure and/or crystallization.

The preparation of numerous 2,5-norbornadienes has been reported in the chemical literature. 7-tertiary butoxy-2,5-norbornadiene has been prepared by the reaction of norbornadiene with tertiary butyl perbenzoate. P. R. Story, J. Am. Chem. Soc., 82, 2085 (1960). 7-alkyl and 7-aryl-2,5-norbornadienes can be prepared by the reaction of the corresponding alkyl and aryl magnesium halide with 7-t-butoxy-2,5-norbornadiene, P. R. Story and S. R. Fahrenholtz, J. Org. Chem., 28, 1817 (1963). 7-hydroxy-2,5-norbornadiene has been prepared by S. Winstein, et al. reported in J. Am. Chem. Soc., 77, 4183 (1955). Acylation of this product with acylating agents such as organic acid anhydrides or halides yields the corresponding 7-ester derivatives.

The preparation of 7 - methanesulfonamido - 2,5 - norbornadiene is described in Example 10. 7-alkylsulfonamido- and 7-arylsulfonamido derivatives can be produced by substitution of the appropriate alkyl or arylsulfonamide for methanesulfonamide in the procedure of Example 10.

The quadricyclene reactants can be prepared from the 7-substituted 2,5-norbornadiene by ultraviolet light photoisomerization according to the method of Hammond et al., J. Am. Chem. Soc., 83, 4674 (1961).

The process for the preparation of the products of this invention containing a hydroxyl group in the 9-position comprises saponification of esters prepared in the manner described above with 5–25% aqueous sodium hydroxide at a temperature of 50–100° C. The quantity of sodium hydroxide solution to ester should be at least a volume ratio of 1:1. Higher volume ratios are preferred. The 7-hydroxy substituted product is isolated from the reaction mixture by neutralization of the sodium hydroxide with a mineral acid such as hydrochloric or sulfuric acid, followed by solvent extraction using ether, chloroform and the like, and removal of the solvent.

The process of this invention for producing either the S-oxides or S-dioxides products of this invention comprises the step of (a) contacting bis(trifluoromethyl)thioketene with the cyclic reactant, (b) saponification of the product, (c) acidification of the reaction mixture with a mineral acid, (d) isolation of the product by solvent extraction followed by removal of the solvent by distillation, (e) oxidizing the product with a quantity of oxidant which produces either the S-oxide or S-dioxide, and (f) recovery of the product produced.

The process steps b–e are omitted when the products desired are the sulfides wherein R is groups other than hydroxyl.

The process steps b–d are omitted when the products desired are S-oxides and S-dioxides wherein R is groups other than hydroxyl.

The process steps e and f are omitted when the products desired are the sulfides wherein R is hydroxyl.

The following examples further illustrate the invention.

Example A

A 400-ml., stainless steel-lined tube containing 60 g. (0.149 mole) of 2,4-bis(dicarbethoxymethylene)-1,3-dithietane was cooled to −80° C. and charged with 10 g. (0.5 mole) of hydrogen fluoride and 125 g. (1.16 moles) of sulfur tetrafluoride. The tube was heated with agitation for two hours each at 125° C. and 150° C. and four hours at 200° C. It was then cooled to room temperature, bled of volatile products, cooled to −80° C. and charged again with 35 g. (1.75 moles) of hydrogen fluoride and 125 g. (1.16 moles) of sulfur tetrafluoride. The recharged tube was heated at 150° C. for two hours and 200° C. for four hours, cooled to room temperature and bled, and the contents were unloaded into a polyethylene bottle. The reaction product was poured onto ice and the crystalline solid which formed was separated by filtration and washed with water and 10% aqueous sodium carbonate solution. The product was then steam-distilled and filtered from the aqueous distillate. The moist crystals were dissolved in boiling methylene chloride, anhydrous magnesium sulfate was added to remove moisture, and the solution was filtered hot. Cooling of the filtrate gave 40 g. (69% yield) of 2,4-bis(hexafluoroisopropylidene)-1,3-dithietane in two crops. This product melts at 84.5–85.5° C. and boils at 173° C.

*Analysis.*—Calcd. for $C_8F_{12}S_2$: C, 24.75; F, 58.74; S, 16.52. Found: C, 24.96; F, 58.28; S, 16.83.

An apparatus for the pyrolysis of 2,4-bis(hexafluoroisopropylidene)-1,3-dithietane was constructed of an unpacked platinum tube, 60 cm. long and 1.25 cm. in diameter, with stainless steel inner joints silver soldered to each end. The tube, fitted with thermocouples, was mounted in a cylindrical heater 30 cm. long, and the assembly was set on a vertical stand at a 30° angle. The lower end of the tube was connected to a glass trap protected with a drying tube and cooled in a Dry Ice-acetone mixture. The upper end of the tube was connected to a side arm of a distilling flask provided with a nitrogen inlet in its neck. The neck and side arm of the flask and the upper end of the pyrolysis tube were wrapped with glass cloth heating tape to keep these parts above the melting point (85° C.) of the dithietane.

The pyrolysis tube was heated at 650° C. and a total of 75 g. of 2,4-bis(hexafluoroisopropylidene)-1,3-dithietane was distilled through under a very slow stream of nitrogen during a 3-hour period. The product collected in the cold trap was distilled to give 50 g. (67% yield) of bis(trifluoromethyl)thioketene boiling at 51–53° C., mostly 52° C., obtained as a reddish orange liquid, $n_D^{25}$ 1.3502, $D_4^{25}$ 1.462.

*Analysis.*—Calcd. for $C_4F_6S$: C, 24.75; F, 58.74; S, 16.52. Found: C, 24.95; F, 58.65; S, 16.54.

The structure is supported by the $F^{19}$ nuclear magnetic resonance spectrum, showing a single peak.

Example 1.—6-hexafluoroisopropylidene-7-thiatetra-
cyclo[3.2.1.1³,⁸.0²,⁴]nonane

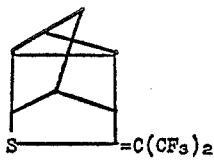

Norbornadiene (3.68 g., 0.04 mole) and 7.76 g. (0.04 mole) of bis(trifluoromethyl)thioketene were sealed in a glass tube and heated at 100° C. for 16 hours. The resulting red liquid was distilled at 106–110° C. at 10 mm. The distillate crystallized in part, and the crystals were filtered off and recrystallized from methanol to give 3.73 g. (33% yield) of the thiatetracyclononane, M.P. 53–53.5° C.

*Analysis.*—Calcd. for $C_{11}H_8F_6S$: C, 46.15; H, 2.82; S, 11.20. Found: C, 46.43; H, 3.14; S, 10.99.

In agreement with the structure, the $F^{19}$ NMR. spectrum consists of two quadruplets. The $H^1$ NMR. spectrum has a multiplet at 1.25–1.75 p.p.m. (3 protons), singlet at 1.85 p.p.m. (2 protons) broad peak at 2.39 p.p.m. (1 proton), multiplet at 3.37 p.p.m. (1 proton), and quadruplet at 3.52 p.p.m. (1 proton). No unsaturated CH is present. The infrared spectrum has a band at 6.20 μ indicative of the exocyclic double bond.

Example 2.—6-hexafluoroisopropylidene-7-thiatetra-
cyclo[3.2.1.1³,⁸.0²,⁴]nonane 7,7-dioxide

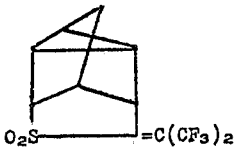

To 2.86 g. (0.01 mole) of the compound of Example 1 was added 20 ml. of acetic acid and 3 ml. (0.029 mole) of 30% hydrogen peroxide and the solution was heated on a steam bath for 4 hours. Water (20 ml.) was slowly added, the mixture was cooled, and the crystals were filtered off. Recrystallization from methanol containing a little water gave 2.93 g. (92% yield) of the sulfone, M.P. 124.5–125° C.

*Analysis.*—Calcd. for $C_{11}H_8F_6O_2S$: C, 41.52; H, 2.53; S, 10.08. Found: C, 41.54; H, 2.74; S, 10.01.

Example 3.—6-hexafluoroisopropylidene-7-thiatetra-
cyclo[3.2.1.1³,⁸.0²,⁴]nonane 7-oxide

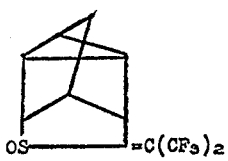

Oxidation of the compound of Example 1 as in Example 2, but with use of a molar equivalent of hydrogen peroxide instead of an excess, gives the very soluble sulfoxide. The residue left by evaporation of the solvent may be crystallized from methanol by cooling in Dry Ice, but the product melts over a range around 40° C. because of the presence of two stereoisomers. Further oxidation of the sulfoxide with hydrogen peroxide yields the sulfone of Example 2.

Example 4.—9-chloro-6-hexafluoroisopropylidene-7-
thiatetracyclo[3.2.1.1³,⁸.0²,⁴]nonane

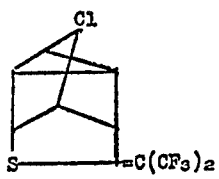

7-chloro-2,5-norbornadiene (9 g., 0.071 mole, commerically available) and 27 g. (0.14 mole) of bis(trifluoromethyl)thioketene were heated in a sealed glass tube at 100° C. for 15 hours. Nine grams of by-product thioketene dimer was removed by filtration from the cooled mixture, and the filtrate was distilled to give 9.37 g. (41% yield) of the thiatetracyclononane, B.P. 68–69° C. at 0.15 mm., $n_D^{25}$ 1.4872.

*Analysis.*—Calcd. for $C_{11}H_7ClF_6S$: C, 41.20; H, 2.20; S, 10.00. Found: C, 41.38; H, 2.37; S, 10.29.

The NMR. spectrum is similar to that for the compound of Example 1.

Example 5.—9-tert-butoxy-6-hexafluoroisopropylidene-7-
thiatetracyclo[3.2.1.1³,⁸.0²,⁴]nonane

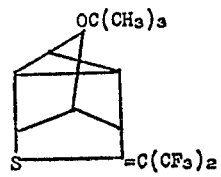

7-tert-butoxy-2,5-norbornadiene (13.02 g., 0.80 mole, commercially available) and 15.52 g. (0.08 mole) of bis(trifluoromethyl)thioketene were heated in a sealed glass tube at 100° C. for 15 hours. The mixture was cooled, a little dichloromethane was added, and 6.9 g. of by-product thioketene dimer was filtered off. The filtrate was distilled at 70° C. and 0.05 mm. and part of the distillate crystallized. The crystals were filtered off, rinsed with methanol, cooled with Dry Ice, and recrystallized from methanol to give 4.48 g. (15.7% yield) of product melting at 72–73° C.

*Analysis.*—Calcd. for $C_{15}H_{16}F_6OS$: C, 50.26; H, 4.50; S, 8.95. Found: C, 50.66; H, 4.60; S, 8.82.

The NMR. spectra show the structure to be analogous to that for the compound of Example 1.

The above crystalline compound is one of the two stereoisomers of the product, the second isomer being found in the liquid filtrate from the crystals. (The stereoisomerism depends on the orientation of the tert-butoxy group with respect to the ring structure in the above formula. The specific orientation in the isomers is not known.)

Example 6.—9-phenyl-6-hexafluoroisopropylidene-7-
thiatetracyclo[3.2.1.1³,⁸.0²,⁴]nonane

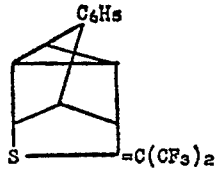

A mixture of 5.5 g. of 7-phenyl-2,5-norbornadiene (Story & Fahrenholtz, J. Org. Chem. 28, 1716 (1963)) and 6.4 g. (0.033 mole) of bis(trifluoromethyl)thioketene was heated in a sealed glass tube at 100° C. for 16 hours. Dimer of the thioketene was filtered from the cooled product and the filtrate was distilled to give 3.8 g. (35% yield) of the thiatetracyclononane, B.P. 103–104° C. at 0.05 mm. This mixture of the two stereoisomers crystallized and melted at about 48–67° C.

*Analysis.*—Calcd. for $C_{17}H_{12}F_6S$: C, 56.35; H, 3.34; S, 8.85. Found: C, 56.65; H, 3.58; S, 8.77.

Example 7.—9-trifluoroacetoxy-6-hexafluoroisopropylidene-7-thiatetracyclo[3.2.1.1$^{3,8}$.0$^{2,4}$]nonane

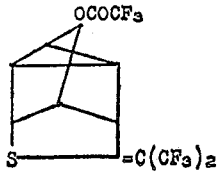

Seven grams (0.034 mole) of 2,5-norbornadien-7-yl trifluoroacetate (Winstein & Ordronneau, J. Am. Chem. Soc. 82, 2084 (1960)) and 13.4 g. (0.69 mole) of bis(trifluoromethyl)thioketene were heated in a sealed glass tube at 100° C. for 16 hours. When cool, the thioketene dimer was filtered off and the filtrate was distilled to give 1.83 g. (13.4% yield) of the thiatetracyclononane, B.P. 70–73° C. at 0.025 mm., $n_D^{25}$ 1.4388.

Similarity of the NMR. spectrum with that of the compound of Example 1 indicates the compound has the structure given.

Example 8.—9-acetoxy-6-hexafluoroisopropylidene-7-thiatetracyclo[3.2.1.1$^{3,8}$.0$^{2,4}$]nonane

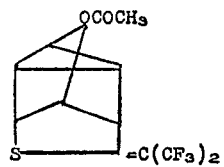

2,5-norbornadiene-7-yl acetate and bis(trifluoromethyl)thioketene were heated in a glass tube according to the procedure of Example 6 and the product was obtained by distillation at 61–65° C. at 0.15 mm.

Example 9.—9-hydroxy-6-hexafluoroisopropylidene-7-thiatetracyclo[3.2.1.1$^{3,8}$.0$^{2,4}$]nonane

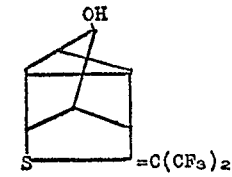

To 2.76 g. (0.00684 mole) of the trifluoroacetate of Example 7 in 5 ml. of methanol was added 0.46 g. (0.00697 mole) of 85% potassium hydroxide in 3 ml. of methanol. The methanol was then evaporated off, water was added, and the product was collected by dissolving it in dichloromethane. After the product was dried over magnesium sulfate, it was distilled: B.P. 81° C. at 0.025 mm.; yield, 1.45 g. or 69%. The viscous liquid distillate crystallized, and was found to consist of a mixture of the two possible stereoisomers melting around 72–93° C. Gas chromatography showed two close peaks.

*Analysis.*—Calcd. for $C_{11}H_8F_6OS$: C, 43.71; H, 2.67; S, 10.61. Found: C, 44.01; H, 2.72; S, 10.45.

The NMR. spectrum corresponded to the structure.

Example 10.—9-(methanesulfonamido)-6-hexafluoroisopropylidene-7-thiatetracyclo[3,2,1,1$^{3,8}$.0$^{2,4}$]nonane

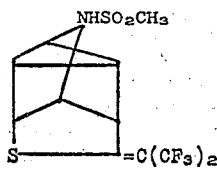

7-(methanesulfonamido)-2,5-norbornadiene (1.85 g., 0.01 mole) and 11.64 g. (0.06 mole) of bis(trifluoromethyl)thioketene were sealed in a glass tube and heated at 100° C. for 15 hours. The excess thioketene dimerized and the dimer was removed from the product by heating at 100° C. at 15 mm. The residue was dissolved in carbon tetrachloride and 0.6 g. of unreacted norbornadiene crystallized out of the solution on seeding. This was filtered off. The filtrate was allowed to stand and the thiatetracyclononane crystallized out; yield, 0.19 g. or 5%. After recrystallization from methanol it melted at 177° C.

*Analysis.*—Calcd. for $C_{12}H_{11}F_6NO_2S_2$: C, 37.99; H, 2.92; S, 16.90. Found: C, 38.37; H, 2.97; S, 16.92.

The NMR. spectrum is similar to that for the other examples, aside from the NH and CH$_3$ peaks.

The 7-(methanesulfonamido)-2,5-norbornadiene for the above synthesis was made as follows: A mixture of 16.4 g. (0.1 mole) of commercially available 7-tert-butoxy-2,5-norbornadiene and 9.5 g. of methanesulfonamide were heated on a steam bath. Three drops of methanesulfonic acid were added, and stirring and heating were continued for 20 minutes. The mixture became homogeneous and crystallized on cooling. Recrystallization from carbon tetrachloride gave 7 g. (38% yield) of 7-(methanesulfonamido)-2,5-norbornadiene, M.P. 110–110.5° C.

*Analysis.*—Calcd. for $C_8H_{11}NO_2S$: C, 51.85; H, 5.98; S, 1730. Found: C, 51.99; H, 6.00; S, 17.63.

The NMR. spectrum in deuterochloroform shows a singlet at 2.96 p.p.m. (CH$_3$), split peak at 3.65 p.p.m. (bridgehead protons), singlet at 3.79 p.p.m. (bridge proton), broad singlet at 5.40 p.p.m. (NH), and quartet at 6.72 p.p.m. (2 CH═CH).

Example 11.—4-hexafluoroisopropylidene-3-thiatricyclo[4.2.1.0$^{2,5}$]non-7-ene

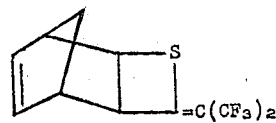

To 4.60 g. (0.05 mole) of tetracyclo-[2.2.1.0$^{2,6}$.0$^{3,5}$]heptane [Quadricyclene. Hammond, Turro, and Fischer, J. Am. Chem. Soc. 83, 4674 (1961)] in 5 ml. of dichloromethane was slowly added 9.70 g. (0.05 mole) of bis(trifluoromethyl)thioketene with stirring and cooling in ice. Distillation gave 10.4 g. (73% yield) of the thiatricyclononene, B.P. 39° C. at 0.08 mm., $n_D^{25}$ 1.4655.

*Analysis.*—Calcd. for $C_{11}H_8F_6S$: C, 46.15; H, 2.82; S, 11.20. Found: C, 46.51; H, 2.90; S, 11.42.

In accordance with the above structure, the proton NMR. spectrum shows a quartet centered at 1.76 p.p.m. (bridge CH$_2$), singlet at 2.83 p.p.m. (2 protons), singlet at 2.93 p.p.m. (1 proton), broad singlet at 3.33 p.p.m. (1 proton), and singlet at 5.95 p.p.m. (CH═CH). The F$^{19}$ NMR. spectrum has two quadruplets. The infrared spectrum has bands at 3.25 μ (═CH), 6.13 μ (exocyclic C═C), and 6.38 μ (cyclic C═C).

Example 12.—4-hexafluoroisopropylidene-3-thiatricyclo-[4.2.1.0$^{2,5}$]non-7-ene 3,3-dioxide The product of Example 11 was oxidized with hydrogen peroxide in acetic acid at room temperature to give the S-dioxide.

Additional representative 6-hexafluoroisopropylidene-7-thiatetracyclo[3.2.1.1$^{3,8}$.0$^{2,4}$]nonanes corresponding to Formula I can be prepared by procedures illustrated in Examples 1–10. Likewise, representative 4-hexafluoroisopropylidene - 3 - thiatricyclo[4.2.1.0$^{2,5}$]non - 7 - enes corresponding to Formula II can be prepared by the procedure of Example 11 and the corollary procedures of Examples 2, 3 and 9.

Additional compounds of Formula I wherein $n$ is 0 obtainable by addition of bis(trifluoromethyl)thioketene to substituted norbornadienes are shown in Table I. The representative X substituents are given, the intermediate norbornadienes and the thiatetracyclononane products being identified by name.

thyl, 4-n-hexylphenyl, 4-dodecylphenyl, 4-n-hexylnaphthyl, 3,4-dimethylphenyl, 3,4-dimethylnaphthyl, 3,4,5-trimethylphenyl, cyclohexylmethyl, cyclopentylmethylcyclohexyl, ethylcyclohexyl, hydroxy, chlorine, ethanesulfonamido, 1-propanesulfonamido, butanesulfonamido, pentanesulfonamido, cyclohexanesulfonamido, dodecanesulfonamido, octadecanesulfonamido, benzenesulfonamido, naphthalenesulfonamido, chlorobenzenesulfonamido, phenylmethanesulfonamido, fluorobenzenesulfonamido, p-methylbenzenesulfonamido, and acyloxy derivatives such as 9-[2,5-norbornadienyl] and 9-[quadricyclenyl] esters of the following acids: formic, propionic, n-butyric, valeric, α-ethylisovaleric, cyclopentanecarboxylic, trifluoroacetic, pentafluoropropionic, myristic, pal-

TABLE I

| X | Norbornadiene Intermediate | Formula I Product |
|---|---|---|
| Methyl | 7-methyl-2,5-norbornadiene | 9-methyl-6-hexafluoroisopropylidene-7-thiatetracyclo-[3.2.1.1$^{3,8}$.0$^{2,4}$]nonane. |
| Octyl | 7-octyl-2,5-norbornadiene | 9-octyl-6-hexafluoroisopropylidene-7-thiatetracyclo-[3.2.1.1$^{3,8}$.0$^{2,4}$]nonane. |
| Cyclohexyl | 7-cyclohexyl-2,5-norbornadiene | 9-cyclohexyl-6-hexafluoroisopropylidene-7-thiatetracyclo-[3.2.1.1$^{3,8}$.0$^{2,4}$]nonane. |
| Benzyl | 7-benzyl-2,5-norbornadiene | 9-benzyl-6-hexafluoroisopropylidene-7-thiatetracyclo-[3.2.1.1$^{3,8}$.0$^{2,4}$]nonane. |
| Bromine | 7-bromo-2,5-norbornadiene | 9-bromo-6-hexafluoroisopropylidene-7-thiatetracyclo-[3.2.1.1$^{3,8}$.0$^{2,4}$]nonane |
| tert-Amyloxy | 7-(tert-amyloxy)-2,5-norbornadiene | 9-(tert-amyloxy)-6-hexafluoroisopropylidene-7-thiatetracyclo[3.2.1.1$^{3,8}$.0$^{2,4}$]nonane. |
| 3-ethyl-3-hexyloxy | 7-(3-ethyl-3-hexyloxy)-2,5-norbornadiene | 9-(3-ethyl-3-hexyloxy)-6-hexafluoroisopropylidene-7-thiatetracyclo[3.2.1.1$^{3,8}$.0$^{2,4}$]nonane. |
| p-Toluoyloxy | 7-(p-toluoyloxy)-2,5-norbornadiene | 9-(p-toluoyloxy)-6-hexafluoroisopropylidene-7-thiatetracyclo[3.2.1.1$^{3,8}$.0$^{2,4}$]nonane. |
| Cyclohexanecarbonyloxy | 7-(cyclohexanecarbonyloxy)-2,5-norbornadiene | 9-(cyclohexanecarbonyloxy)-6-hexafluoroisopropylidene-7-thiatetracyclo[3.2.1.1$^{3,8}$.0$^{2,4}$]nonane. |
| Heptanoyloxy | 7-heptanoyloxy-2,5-norbornadiene | 9-heptanoyloxy-6-hexafluoroisopropylidene-7-thiatetracyclo[3.2.1.1$^{3,8}$.0$^{2,4}$]nonane. |
| β-Naphthalenesulfonamido | 7-(β-naphthalenesulfonamido)-2,5-norbornadiene | 9-(β-Naphthalenesulfonamido)-6-hexafluoroisopropylidene-7-thiatetracyclo[3.2.1.1$^{3,8}$.0$^{2,4}$]nonane. |
| 4-methylcyclohexanesulfonamido | 7-(4-methylcyclohexanesulfonamido)-2,5-norbornadiene | 9-(4-methylcyclohexanesulfonamido)-6-hexafluoroisopropylidene-7-thiatetracyclo[3.2.1.1$^{3,8}$.0$^{2,4}$]nonane. |
| Phenoxy | 7-phenoxy-2,5-norbornadiene | 9-phenoxy-6-hexafluoroisopropylidene-7-thiatetracyclo-[3.2.1.1$^{3,8}$.0$^{2,4}$]nonane. |

Compounds of Formula II ($n=0$) obtainable by addition of bis(trifluoromethyl)thioketene to substituted tetracyclo[2.2.1.0$^{2,6}$.0$^{3,5}$]heptenes are shown in Table II. The table shows representative X-substituents together with the corresponding intermediate quadricyclenes and the thiatricyclo[4.2.1.0$^{2,5}$]non-7-ene products.

mitic, stearic, phenylacetic, p-isopropylphenylacetic, p-t-butylbenzoic, diphenyl acetic, α-naphthoic acid and the like.

The compounds of this invention are useful as plasticizers for polythiocarbonyl fluoride (CF$_2$S)$_x$. This polymer is deficient in flow properties. It crystallizes at room

TABLE II

| X | Quadricyclene Intermediate | Formula II Product |
|---|---|---|
| Ethyl | 7-ethyltetracyclo[2.2.1.0$^{2,6}$.0$^{3,5}$]heptane | 9-ethyl-4-hexafluoroisopropylidene-3-thiatricyclo[4.2.1.0$^{2,5}$]non-7-ene. |
| Isoamyl | 7-isoamyltetracyclo[2.2.1.0$^{2,6}$.0$^{3,5}$]heptane | 9-isoamyl-4-hexafluoroisopropylidene-3-thiatricyclo[4.2.1.0$^{2,5}$]non-7-ene. |
| 2,4-dimethylphenyl | 7-(2,4-dimethylphenyl)tetracyclo[2.2.1.0$^{2,6}$.0$^{3,5}$]heptane | 9-(2,4-dimethylphenyl)-4-hexafluoroisopropylidene-3-thiatricyclo[4.2.1.0$^{2,5}$]non-7-ene. |
| 2-phenylethyl | 7-(2-phenylethyl)tetracyclo[2.2.1.0$^{2,6}$.0$^{3,5}$]heptane | 9-(2-phenylethyl)-4-hexafluoroisopropylidene-3-thiatricyclo[4.2.1.0$^{2,5}$]non-7-ene. |
| Fluorine | 7-flurotetracyclo[2.2.1.0$^{2,6}$.0$^{3,5}$]heptane | 9-fluoro-4-hexafluoroisopropylidene-3-thiatricyclo[4.2.1.0$^{2,5}$]non-7-ene. |
| tert-Butoxy | 7-(tert-butoxy)tetracyclo[2.2.1.0$^{2,6}$.0$^{3,5}$]heptane | 9-(tert-butoxy)-4-hexafluoroisopropylidene-3-thiatricyclo[4.2.1.0$^{2,5}$]non-7-ene. |
| Benzoyloxy | 7-benzoyloxytetracyclo[2.2.1.0$^{2,6}$.0$^{3,5}$]heptane | 9-benzoyloxy-4-hexafluoroisopropylidene-3-thiatricyclo[4.2.1.0$^{2,5}$]non-7-ene. |
| Isobutyryloxy | 7-isobutyryloxytetracyclo[2.2.1.0$^{2,6}$.0$^{3,5}$]heptane | 9-isobutyryloxy-4-hexafluoroisopropylidene-3-thiatricyclo[4.2.1.0$^{2,5}$]non-7-ene. |
| Methanesulfonamido | 7-methanesulfonamidotetracyclo[2.2.1.0$^{2,6}$.0$^{3,5}$]heptane | 9-methanesulfonamido-4-hexafluoroisopropylidene-3-thiatricyclo[4.2.1.0$^{2,5}$]non-7-ene. |

Included among the 7-substituted 2,5-norbornadienes and 7-substituted quadricyclenes, which can be reacted with bis(trifluoromethyl)thioketene to produce the 9-substituted sulfides of this invention are, 2,5-norbornadienes and quadricyclenes substituted in the 7-position with the following groups: n-propyl, isopropyl, n-butyl, isobutyl, sec-butyl, pentyl, n-hexyl, 2-ethylhexyl, n-decyl, n-dodecyl, n-tetradecyl, n-octadecyl, cyclopentyl, cyclooctyl, cyclododecyl, α-phenylethyl, α-phenyloctyl, 1-naphthylmethyl, 2-naphthylethyl, 2,2,3,3-tetrafluoro-n-propyl, 2,2,3,3,4,4,5,5-octafluoro-n-pentyl, p-fluorophenyl, pentafluorophenyl, chlorophenyl, 2-methyl-n-butoxy, triethylmethoxy 4-methoxyphenyl, 4-ethylphenyl, 4-methylnaphtemperature and during crystallization changes from an elastomeric to a rigid form. The present compounds increase the flowability of the polymer in molding operations and inhibit the loss of desirable elastic properties. The plasticizer may be incorporated in the polymer by soaking 4 parts of polymer in a solution of 1 part of a compound of this invention dissolved in 1.5 parts of chloroform. The swollen polymer is then dried at 80° C. and may be molded at 150° C.

The plasticizing effects of the compounds are not limited to the above specialty polymer. Vinyl polymers and rubbers may also be plasticized using the compounds of this invention.

The foregoing detailed description has been given for clarity of understanding only and no unnecessary limitations are to be understood therefrom. The invention is not limited to the exact details shown and described for obvious modifications will be apparent to those skilled in the art.

The embodiments of the invention in which an exclusive property or privilege is claimed are defined as follows:

1. A compound of the formulae

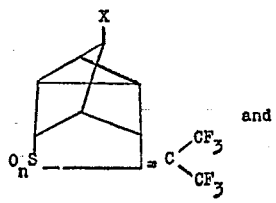 and 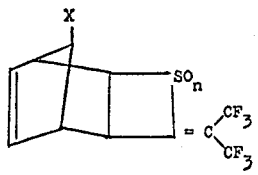

wherein X is a member selected from the group containing up to 18 carbon atoms consisting of hydrogen; hydroxy; a monovalent group R selected from alkyl, cycloalkyl, alkylcycloalkyl, aryl, alkaryl, fluoroalkyl, fluoroaryl, chloroaryl, or aralkyl; halogen; tertiary alkoxy; aryloxy; RCOO— and $RSO_2NH$—; and $n$ is an integer from 0 to 2.

2. The compound of claim 1 wherein X is phenyl and $n$ is 0, said compound being 9-phenyl-6-hexafluoroisopropylidene-7-thiatetracyclo[3.2.1.1$^{3,8}$.0$^{2,4}$]nonane.

3. Compound of claim 1 wherein X is hydrogen and $n$ is 1, said compound being 6-hexafluoroisopropylidene-7-thiatetracyclo[3.2.1.1$^{3,8}$.0$^{2,4}$]nonane 7-oxide.

4. A compound of claim 1 wherein X is hydrogen and $n$ is 0, said compound being 6-hexafluoroisopropylidene-7-thiatetracyclo[3.2.1.1$^{3,8}$.0$^{2,4}$]nonane.

5. A compound of claim 1 wherein X is hydrogen and $n$ is 0, said compound being 4-hexafluoroisopropylidene-3-thiatricyclo[4.2.1.0$^{2,5}$]non-7-ene.

6. A compound of claim 1 wherein X is hydrogen and $n$ is 2, said compound being 6-hexafluoroisopropylidene-7-thiatetracyclo[3.2.1.1$^{3,8}$.0$^{2,4}$]nonane 7,7-dioxide.

7. A compound of claim 1 wherein X is hydrogen and $n$ is 2, said compound being 4-hexafluoroisopropylidene-3-thiatricyclo[4.2.1.0$^{2,5}$]non-7-ene 3,3-dioxide.

8. Process for preparing a compound of claim 1 comprising the steps
(a) contacting bis(trifluoromethyl)thioketene with a compound selected from the group consisting of

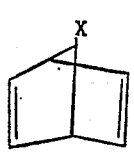 and 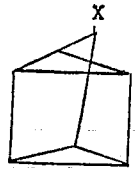

wherein X is as defined in claim 1 wherein said step is conducted at a temperature of 25–150° C.,
(b) contacting the product obtained in step (a) with 5–25% aqueous sodium hydroxide, at a temperature of 50–100° C. wherein the volume ratio of the product of step (a) and aqueous sodium hydroxide is at least 1:1,
(c) reacting the reaction mixture of step (b) with the quantity of dilute mineral acid required to neutralize the aqueous sodium hydroxide,
(d) recovering a product produced thereby.

9. Process for producing a compound of claim 1 comprising the steps
(a) contacting bis(trifluoromethyl)thioketene with a compound selected from the group consisting of

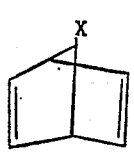 and 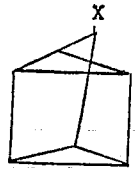

wherein X is as defined in claim 1 wherein said step is conducted at a temperature of 25–150° C.,
(b) contacting the product obtained in step (a) with 5–25% aqueous sodium hydroxide, at a temperature of 50–100° C. wherein the volume ratio of the product of step (a) and aqueous sodium hydroxide is at least 1:1,
(c) reacting the reaction mixture of step (b) with the quantity of dilute mineral acid required to neutralize the aqueous sodium hydroxide,
(d) contacting the product of step (c) with an oxidizing agent at a temperature of 0–100° C.,
(e) isolating the product produced by solvent extraction followed by removal of solvent,
(f) recovering the product produced thereby.

10. Process of claim 8 wherein step (a) is conducted in a liquid solvent medium inert to the reactant and product.

11. Process of claim 8 wherein the reactant is 2,5-norbornadiene.

12. Process of claim 8 wherein the reactant is quadricyclene.

References Cited

UNITED STATES PATENTS

| | | | |
|---|---|---|---|
| 2,623,069 | 12/1952 | Wilkes | 260—332.1 |
| 3,251,857 | 5/1966 | Hostettler et al. | 260—327 |

OTHER REFERENCES

Birch et al., J. Chem. Soc. (1951), pp. 2560–1.
Wagner et al., Syn. Org. Chem. Wiley and Sons. New York (1953), pp. 416–7 and 801.

JAMES A. PATTEN, *Primary Examiner.*